United States Patent
Bruce et al.

(10) Patent No.: US 7,436,979 B2
(45) Date of Patent: Oct. 14, 2008

(54) METHOD AND SYSTEM FOR IMAGE PROCESSING

(75) Inventors: Ben F. Bruce, Arlington, TX (US); Linda J. Kessler, Washington, DC (US)

(73) Assignee: Siemens Energy & Automation, Alpharetta, GA (US)

( * ) Notice: Subject to any disclaimer, the term of this patent is extended or adjusted under 35 U.S.C. 154(b) by 579 days.

(21) Appl. No.: 10/113,814

(22) Filed: Mar. 29, 2002

(65) Prior Publication Data

US 2002/0168090 A1 Nov. 14, 2002

Related U.S. Application Data

(60) Provisional application No. 60/280,166, filed on Mar. 30, 2001.

(51) Int. Cl.
*G06K 9/00* (2006.01)
(52) U.S. Cl. .................................................. 382/101
(58) Field of Classification Search .............. 382/101, 382/171, 173–231, 181–190, 198, 284, 321
See application file for complete search history.

(56) References Cited

U.S. PATENT DOCUMENTS

| | | | | |
|---|---|---|---|---|
| 5,014,329 A | * | 5/1991 | Rudak | 382/163 |
| 5,031,223 A | * | 7/1991 | Rosenbaum et al. | 382/101 |
| 5,237,628 A | * | 8/1993 | Levitan | 382/175 |
| 5,311,999 A | | 5/1994 | Malow et al. | 209/583 |
| 5,422,821 A | | 6/1995 | Allen et al. | 364/478.07 |
| 5,555,556 A | * | 9/1996 | Ozaki | 382/173 |
| 5,703,783 A | | 12/1997 | Allen et al. | 364/478.01 |
| 5,751,843 A | | 5/1998 | Maggioni et al. | 382/154 |
| 5,754,671 A | * | 5/1998 | Higgins et al. | 382/101 |
| 5,770,841 A | | 6/1998 | Moed et al. | |
| 5,923,792 A | * | 7/1999 | Shyu et al. | 382/309 |
| 6,014,450 A | * | 1/2000 | Heilper et al. | 382/101 |
| 6,738,496 B1 | * | 5/2004 | Van Hall | 382/101 |
| 6,741,737 B1 | * | 5/2004 | Lenoir | 382/176 |

FOREIGN PATENT DOCUMENTS

| | | |
|---|---|---|
| DE | 100 10 241 C1 | 3/2001 |
| EP | 0 589 119 A1 | 3/1994 |

(Continued)

*Primary Examiner*—Tom Y Lu

(57) ABSTRACT

A method of processing an image containing written information according to the invention includes the steps of scanning a surface of an object to obtain an image of the surface represented by image data, analyzing the image data to determine locations of one or more regions with written indicia on the surface, where indicia may include logos, stamps, meter marks, alphanumeric information, labels or other distinctive marks, creating one or more sub-images substantially limited to the dimensions of the indicia-bearing regions, transmitting the sub-images from a first computer or process used to create the sub-images to a second computer or process, and further analyzing the sub-images at the second computer or process, such as by OCR, to decode the written indicia in the sub-images. By transmitting the sub-images, preferably in combination with position data indicating where each sub-image was on the original image, the scanned written indicia can be decoded automatically or manually without having to transmit the original image from one computer or process to another. This is particularly important when the image data is a grayscale or color image that is much larger than a black and white (binary) image of the same dimensions.

5 Claims, 2 Drawing Sheets

FOREIGN PATENT DOCUMENTS

| | | |
|---|---|---|
| EP | 0 720 114 A3 | 11/1995 |
| WO | WO 90/04837 A1 | 5/1990 |
| WO | WO 97/09691 | 3/1997 |
| WO | WO 97/38382 | 10/1997 |
| WO | WO 97/38394 | 10/1997 |
| WO | WO 98/43751 | 10/1998 |
| WO | WO 01/22354 A1 | 3/2001 |

* cited by examiner

FIG. 3

| 53 | Mr. John Smith — 57 |
|---|---|
| (handwritten address 51) | Recipient |
| | 1420 Mockingbird (Unknown) — 58 |
| | Street Address |
| | (Unknown) / TX / (Unknown) |
| | City 59 / State 61 / Zip 62 |

| 54 | Mr. Ray Smith — 57 |
|---|---|
| Mr. Ray Smith | Recipient |
| 1920 Avenue F | 1920 Avenue F — 58 |
| Washington D.C. 20231-1234 (52) | Street Address |
| | Washington / D.C. / 20231-1234 |
| | City 59 / State 61 / Zip 62 |

(none)
Other Caption

[Done]

METHOD AND SYSTEM FOR IMAGE PROCESSING

RELATED APPLICATIONS

This application is a conversion of U.S. Provisional Application Ser. No. 60/280,166, filed Mar. 30, 2001, the disclosure of which is incorporated herein for all purposes.

TECHNICAL FIELD

The present invention relates to the manual, semi-automated and automated processing of images, in particular to the scanning and processing of images of mail pieces to decode address and other information.

BACKGROUND OF THE INVENTION

In the processing of postal mail and parcels, image scanners of various types are used to capture an image of one or more surfaces of a mail piece. The image is then analyzed using automated or human-aided systems such as optical character recognition (OCR), a bar code reader (BCR), specialized video processing systems, image processing systems, forms readers, forms video processing, and video coding systems. Allen et al. U.S. Pat. No. 5,422,821 describes such one such system wherein mail piece addresses and bar codes are scanned and checked against a forwarding address database so that forwarding to the new address can occur without first sending the mail piece to the old address.

U.S. Pat. No. 5,311,999 describes a tunnel scanner for packages wherein image data for different sides of the parcel is taken in a rough scan, and then a fine scan is made of one of the sides based on operator recognition of a split screen display of all the scanned images, e.g., the one with the writing on it is chosen. The partial image is chosen by the operator using a touch screen, mouse or similar device. In an alternative automated embodiment, six images obtained from the rough scan are examined for regions which coincide in a selection of features with the model of an address sticker or an address region on a package. Features of this type are, for example, the color contrast of an area compared to its surroundings, the gray value contrast of an area compared to its surroundings, the shape of this area, the type and number of dark regions within the area, its location with respect to other distinct objects and with respect to the outline of the package. According to known image recognition methods, the image most likely containing an address region is selected automatically from the images obtained by rough scanning, whereupon this region is subjected to fine scanning. The images may also already be supplied to an automatic character recognition device. Fine scanning then takes place only if the images obtained by rough scanning are rejected by the character recognition device. The evaluation of the images obtained by fine scanning may then be effected, in addition to or as an alternative to the above-mentioned character recognition device, by one or several video coding devices. As this patent illustrates, the image can be analyzed using automated or human-aided systems.

Conventional scanning methods rely on a number of techniques for identifying and decoding possible regions of interest on a scanned mail piece. According to one such system, the overall image is subdivided into a 3-by-3 array of nine areas. Each area has a predetermined probability associated with it that any written matter found within the area will be an address. The center area has the highest probability. Current software also checks written matter in each region to determine whether it forms lines, is text justified, uses a single (common) font, and whether the matter is a bar code. All of these factors are considered in determining whether an address or other specific type of identification has been found. For purposes of performing several different kinds of analysis (e.g., OCR) simultaneously, it is preferred to send the initial scan results to more than one computer, process or processor.

Scanning systems of the kind used to read mail can also be used to read forms, such as postal change of address forms. According to current United States Postal Service (USPS) procedures, a person wishing to have the USPS forward mail to a new address submits a Change of Address (COA) Order Form (Form 3575) that requests mail forwarding. This form is normally completed by hand-printing the requested information including name, old address, new address, effective date and duration of the change on the form and submitting the form to a local post office. Bruce et al. U.S. Pat. No. 6,741,724, May 25, 2004, the contents of which are hereby incorporated by reference herein for all purposes, provides a process for handling such forms wherein it is necessary to transmit the image from the computer or process associated with the scanner to a second computer or process which is used to analyze (decode) the image. The images are generally transmitted through a network or other data communication line.

For purposes of both mail pieces and form processing, the throughput of the scanning system should be as high as possible. The number of images transmitted through for processing per second is therefore large, and the speed of the network can be a limiting factor. In particular, this has inhibited the use of more data-intense types of image formats which may be easier to decode than simple black and white images. For example, it is estimated by the present inventors that the success for OCR and handwriting recognition software could be increased several percent if grayscale and/or color images could be sent for analysis. However, such images are much larger than black and white binary images and network speed becomes a severe limitation. The present invention addresses this problem.

SUMMARY OF THE INVENTION

A method of processing an image containing written information according to the invention includes the steps of scanning a surface of an object to obtain an image of the surface represented by image data, analyzing the image data to determine locations of one or more regions with written indicia on the surface, where indicia may include logos, stamps, meter marks, alphanumeric information, labels or other distinctive marks, creating one or more sub-images ("snippets") substantially limited to the dimensions of the indicia-bearing regions, transmitting the sub-images from a first computer or process used to create the sub-images to a second computer or process, and further analyzing the sub-images at the second computer or process, such as by OCR, to decode the written indicia in the sub-images. By transmitting the sub-images, preferably in combination with position data indicating where each sub-image was on the original image, the scanned written indicia can be decoded automatically or manually without having to transmit the original image from one computer or process to another. This is particularly important when the image data is a grayscale or color image that is much larger than a black and white (binary) image of the same dimensions.

The invention further provides a system for processing an image containing written information according to the foregoing method. Such a system includes a scanner for scanning the surface of an object to obtain an image of the surface represented by image data, a first computer having a memory, means for analyzing the image data on the first computer to determine locations of one or more regions with written indicia on the surface, means for creating one or more sub-images substantially limited to the dimensions of the indicia-bearing regions and for storing the sub-images in the memory of the first computer, means for transmitting the sub-images from the first computer or process to a second computer or process, and means for analyzing the sub-images at the second computer or process to decode the written indicia in the sub-images. The various means referred to may include hardware, software and combinations of both where appropriate. For example, the means for analyzing the image data on the first computer is preferably software that operates on the first computer, whereas the transmitting means includes both the communications software and line (such as a network line) over which the data is transmitted.

It will be appreciated that the sub-images, or snippets as described below, are essential to the invention but exist mainly as data in memory and as a signal transmitted from one computer or process to another. Snippet data may be saved on a permanent data storage medium, but there is normally no need to do so. Accordingly, a data signal or digital data packet according to one aspect of the invention includes a sub-image created by scanning a surface of an object to obtain an image of the surface represented by image data, analyzing the image data to determine locations of one or more regions with written indicia on the surface, and creating one or more sub-images substantially limited to the dimensions of the indicia-bearing regions, together with location parameters indicating the position of the sub-image on the original scanned image. The packet may further include one or more additional sub-images and associated location parameters, wherein the sub-images of the packet each represent different areas of the scanned image surface. These and other aspects of the invention are further discussed in the detailed description which follows.

BRIEF DESCRIPTION OF THE DRAWING

In the accompanying drawing, wherein like numerals represent like elements:

FIG. 3 is a schematic diagram of an alternative display of sub-images according to the invention in combination with an on-screen VDT form.

DETAILED DESCRIPTION

The present invention provides an apparatus and method for using sub-images or "snippets" in order to minimize the cost of image processing through network optimization as well as utilizing the snippets to produce the most highly optimized machine and operator interface possible, thereby maximizing the opportunity for an automated solution thru the use of optical character recognition (OCR), bar code readers (BCR), specialized video processing systems, image processing systems, forms readers, forms video processing, video coding systems and/or any combination thereof A "snippet" or sub-image for purposes of the invention is a segment or portion of a digitized image that has been identified and separated into identifiable data that may be transmitted electronically from one computer, processor or location to another. The snippet may then be processed individually or it may be logically associated with other snippets to reconstruct a facsimile of the original layout of the scanned image with each individual snippet located and oriented at its original coordinates (location) within the layout as described hereafter. Snippets may also be placed at a proportionately scaled location within the layout, thereby allowing the contents of a large scanned image to be represented on a much smaller operator screen. Alternatively, the snippets may be arranged or positioned in such a manner as to optimize the operator interface with respect to recognition and processing of data. Some snippets will contain written information or indicia such as bar codes or written address information. For this purpose, it is necessary to first determine what kind of information the snippet contains, if any, and then decode that information.

In mail processing, the throughput of the system should be as great as possible, preferably at least 36,000 images per hour or 10 images per second, with about 100 milliseconds between image captures. Thus, if the full image is transmitted to one or more secondary computers for processing, the data flow could easily exceed 10 megabytes per second, more than presently available networks can handle. The method of the present invention addresses this limitation by transmitting only relevant portions of the scanned image, in the form of snippets, for secondary processing.

Figure 1:
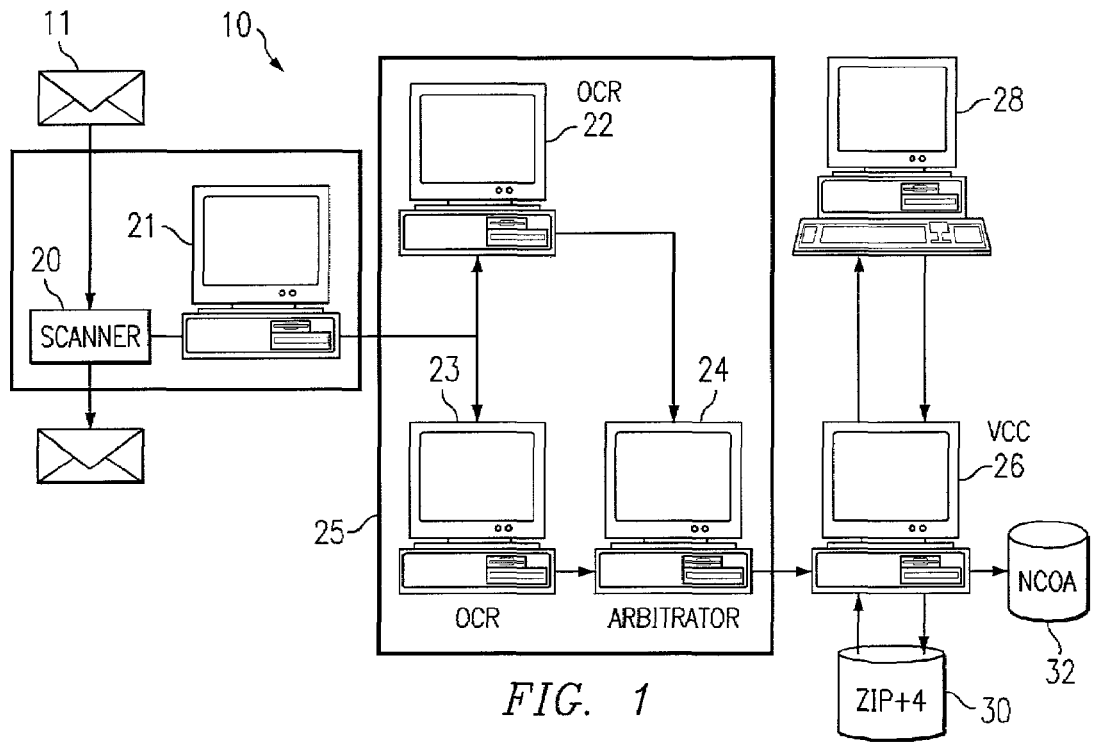
FIG. 1 is a schematic diagram of a system for scanning mail pieces according to the invention.

A system 10 of the present invention, as shown in FIG. 1, provides for two stages of image analysis. A series of mail pieces, forms or other items 11 are presented one after another past a scanner 20, such as a 1 megabit grayscale camera. Preferably, the base image is a grayscale or color image which can be decoded more accurately than a black and white binary image. If the item to be scanned is a parcel, scanner 20 may comprise a tunnel scanner that creates several images representing each wall of the parcel, each of which would then be analyzed for areas of interest according to the invention. The first stage scan can occur during processing by any of a number of known scanners or image lift devices including a variety of specialized or commercial-off-the-shelf image capture hardware and mail sorting machines, including but not limited to MLOCR (multi-line optical character reader) with ISS (input subsystem including image and ID tag capture features), DIOSS (delivery bar code sorter with input output subsystem) and DBCS/OCR. In the first stage, a first computer or process 21 having direct access to the digital image data from the camera creates the snippets. Such direct access in this context means that first computer or process 21 receives the data without an intervening step of transmitting it through a network or other communications line or link. This can be accomplished, for example, by having computer or process 21 physically adjacent to scanner 20 so that the scan results are loaded directly into memory of computer or process 21 via either specialized or commercial-off-the-shelf image capture hardware.

A grayscale image has an associated white level which represents background noise. Contrasting areas are identified using known methods, and the boundaries of such areas are determined. For purposes of the present invention, each "snippet" or sub-image created at this stage of the process may be limited in its dimensions exactly to the contrasting area, or a slight margin may be permitted around the contrasting area. In other words, the snippet may for example be up to 25% larger in its dimensions that the contrasting area that is to be analyzed for possible content. However, for purposes of efficiency, the sub-image is preferably no more than 10% larger than the length and width of the portion of the area that contrasts with the background. The snippet or sub-image is preferably square or rectangular so that its dimensions can be easily stored in a computer memory or mass data storage device.

In a preferred embodiment of the invention, a data block location (DBL) software program is utilized on computer 21 to identify snippets that are of interest for further processing in specific applications. This DBL program may be preprogrammed for forms processing or parameter driven for specialized applications such as address block or indicia location. Once the data block of interest is identified, the coordinates of the data block are acquired and the coordinate information is embedded in the header block or associated file of each snippet along with other necessary information such as the snippet size. In the event multiple data blocks are required to process a given image, additional information may be included in the header or associated file to identify the number of data blocks to be processed, the order of processing, and any other necessary parameters. Individual snippets may be transmitted and processed individually. Multiple snippets may be tagged and transmitted as individual entities, but identified and processed together. Snippets may also be collected into packets in order to assemble and transmit complete image data packages that can be disassembled and processed as a set, or reassembled on an operator screen to resemble the original image, or reassembled to form a single image. Although this methodology is generally usable for processing any type of image data, specialized processing for mail piece scanning may also be used, such as indicia recognition, reading endorsements, and reading return addresses in order to achieve desired results.

Using the foregoing methods, first computer 21 creates the sub-images and stores them in its memory, with the associated position data. Such data may comprise, for example, the coordinates of the upper right and lower left corners of the sub-image relative to the upper left corner of the original image. The sub-images may be bundled together and/or grouped together using an image array naming scheme so that the sub-images from the same original image can be identified for further processing. Computer or process 21 transmits each group of sub-images to one or more second computers or processors 22, 23 for further processing. Each secondary computer or process 22, 23 attempts to identify and analyze the sub-images using known but different methods. Preferably, each computer or process works in parallel to the other(s) using different OCR software systems, and two or more independent results are reported to a third computer or process 24, which acts as an arbitrator as described in the foregoing U.S. Pat. No. 6,741,724, issued May 25, 2004, determining which if any of the decoded information represents the actual address.

Second computers 22, 23 and arbitrator 24 may represent different software routines that run on the same computer. However, in order improve the throughput of the system, it may be necessary to provide a separate processor for each of these components so that each can operate concurrently. A dual processor SMP (symmetrical multi processor) computer is preferred as the image handling computer system (IHC) 25 that runs software implementing the logic of processors 22, 23 and arbitrator 24.

Composite decoded text in the form of an electronic data stream with an associated ID number is sent to a video coding computer or process (VCC) 26. VCC 26 preferably performs an extraction coding operation that converts displayed indicia or other information to the format required for further processing or finalized results. One example of this could be to utilize this process to convert address data to an abbreviated coded format including enough information to uniquely identify the address. Additional information such as an apartment number could be appended if necessary. If there are no scan inconsistencies in the text data requiring resolution, VCC 26 performs a check in an address verification database 30 using the extraction code to determine that the address listed on mail piece 11 is valid. Verification database 30 may be, for example, a locally accessible copy of the USPS ZIP+4 database, which cross-references delivery point ZIP codes for all destination addresses known to the USPS. If the address is not valid, the data for mail piece 11 is diverted for manual review to VDT 28. Optionally, VCC 26 checks valid addresses against a change of address database 32, such as the USPS National Change of Address (NCOA) database, and appropriate steps are taken to label the mail piece 11 for forwarding to the new address if a match is found.

At VDT 28, according to one aspect of the invention, the original image is reconstructed using the sub-images on a video screen or similar type of display. As shown, a mail piece displayed image 40 includes a first sub-image 41 which been identified as the return address, a second sub-image 42 which has been identified as a sender notification caption, a third sub-image 43 which has been identified as the recipient address, and a fourth sub-image 44 which represents a stamp, postmark, etc. Other typical sub-images (not shown) would include bar codes and the like. The background area 46 of the original image is reproduced as a blank area only, and the sub-images may if be shown on a larger scale than the background area 46 representing the shape of the original image. This may be useful, for example, if the original image was large and displaying the entire reconstructed image to scale would result in some parts of the display being too fine to see on a typical video screen. However, other options for enlargement could be used, for example, providing an option to switch magnifications and, at higher resolutions, showing only part of the image. In the latter option, the user would be able to scroll to different parts of the enlarged image by typical navigation tools such as scroll bars or mouse click and drag image scrolling. The printed or handwritten contents of the snippets can then be entered on another portion of the display or on a second screen containing a video coding form to be filled in.

Figure 2:
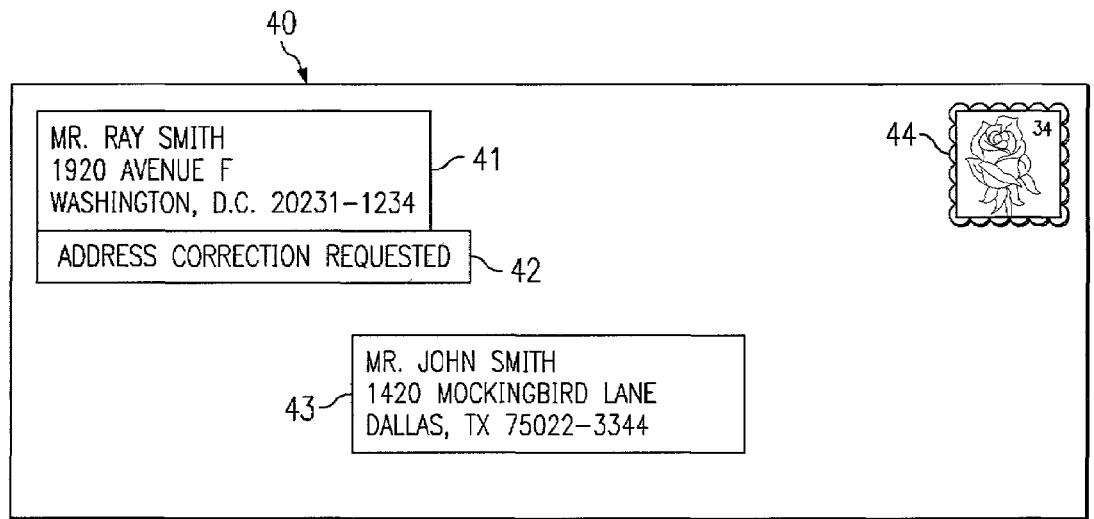
FIG. 2 is a schematic diagram of a display of sub-images according to the invention.

FIG. 3 illustrates an alternative to FIG. 2 wherein the snippets are reproduced individually rather than in a reproduction of the original image. In this embodiment, sub-images 51 and 52 are identified as recipient and sender addresses respectively in prior processing and reproduced in separate screen objects, such as image or picture boxes 53, 54. An on-screen form 56 is reproduced in alignment with the corresponding sub-image displays (side by side is preferred) so that the operator can compare the actual image with the OCR results with minimum effort, make any necessary corrections, and dispose of the mail piece by correcting the address or marking it as undeliverable. Form 56 includes individual text boxes for respective data fields such as name 57, street address 58, city 59, state/country 61 and zip 62. The various data fields can be left blank at start or partially or fully filled in with the automated system's best estimate as to the content of the image. The corrected address is validated against databases 30, 32 as necessary, automatically at the end of each edit session and optionally in response to a request made by the operator, such as by clicking on a "check against zip+4 database" button or similar on-screen control. In general, the snippets or sub-images are placed on the data entry screen in a manner that optimizes the operator interface, thereby maximizing operator productivity and minimizing operator errors.

There are several essential advantages of snippet processing as described in the foregoing examples when adapted to mail piece scanning. Utilizing snippets of images rather than the entire image reduces the transmission time of the data packets. This is applicable to both local and wide area network applications where the image data from the scanning machine must be transmitted to another computer or process for analysis. Utilizing snippets of images rather than the entire image reduces the bandwidth requirement of the transmission line and the associated network components, thereby reducing the initial cost of the network implementation as well as the recurring cost associated with data transmission. Snippets may be transmitted and processed individually, or multiple snippets may be tagged and transmitted individually, but may subsequently be identified and processed together. Snippets may also be collected into "packets" in order to transmit complete image data packages that can be disassembled and processed as a set. Snippets may be used with a wide variety of scanning methods, including OCR, BCR, specialized video processing systems, image processing systems, forms readers, video coding systems or any combination thereof In complex mail systems, T-1/T-3 network cost is a major expense factor. Snippet processing can achieve a savings of at least 30% on letter mail processing alone.

Other forms which must be scanned and manually coded, such as change of address forms, vouchers, and the like can also be processed according to the method of the invention. For example, USPS Form 3575 includes spaces for start date, temporary/permanent move, discontinue forwarding date, individual or family, name and business name, old and new addresses, and signature. The form encourages the user to print one letter per square. In the first stage of analysis, the locations of the data blocks are known in advance and thus the snippets can be created rapidly and easily.

Use of data block location (DBL) software according to the invention on computer 21 is especially preferred so that only pertinent snippets such as address blocks are transmitted to processors 22-24 for analysis. When the same images are being transmitted to a number of different processors for parallel processing using the same physical network, snippet processing represents a huge reduction in the bandwidth requirement.

With respect to flats or parcel processing wherein it may not be possible to identify the function of the each snippet or sub-image in advance, "pasting" the snippets back into the same locations and in the original orientations on the operator's screen, thereby reconstructing the original layout of the scanned image, is important. This allows the operator to use the physical location of the various snippets on the on the screen to differentiate between the addressee and the return address, among other things. In the case of a mail piece that is forwarded in accordance with the process described in the foregoing U.S. Pat. No. 5,422,821, a sender notification request ("ADDRESS CORRECTION REQUESTED") can be generated using the snippets in a reconstruction of the original image.

As an alternative to on-screen reconstruction of the image, the snippets can be pasted into a new image in the same relative positions they occupied in the original. In the new image, however, the background areas are represented by a uniform null value and as such the new image is greatly reduced in size compared to the original, especially where the original image is color or grayscale. Such a reconstructed image may then be saved to storage medium such as a hard disk drive or CD, displayed on screen, or the like without the need to create special data formats for the snippets.

After image processing is completed for each, snippet data may be discarded, or it may be saved on a data storage medium and/or transmitted to one or more recipients. As to change of address data, for example, data packets containing the snippets and optionally the position information for reconstructing a likeness of the original image may be provided to subscribers such as Address Change Service (ACS) participants, delivery confirmation customers, and the like. Hard copies of scanned and processed images may be printed out as needed.

Although various embodiments of the invention have been illustrated in the accompanying drawing and described in the foregoing detailed description, it will be understood that the invention is not limited to the embodiments disclosed but, as will be appreciated by those skilled in the art, is susceptible to numerous modifications and variations without departing from the spirit and scope of the invention as hereinafter claimed. The described system process is applicable to any information bearing item wherein the information is to be scanned and entered into a database.

The invention claimed is:

1. A method of processing an image of a mail piece having containing written delivery information, comprising the steps of:
    (a) presenting a series of mail pieces one after another to a scanner;
    (b) scanning a surface of each mail piece with the scanner to obtain an image of the surface represented by image data;
    (c) analyzing the image data to determine locations of one or more regions with written indicia on the surface, the remainder of the image data comprising background image data;
    (d) creating one or more sub-images in a grayscale or color format substantially limited to the dimensions of the indicia-bearing regions, which indicia bearing regions include a delivery address:
    (e) electronically transmitting the sub-images substantially free of background image data, and also transmitting coordinates of the sub images indicating where the sub-image was located in the surface image whereby each sub-image can be displayed at a position that corresponds to its original location in the image of the mail piece surface allowing re-creation of the surface image without the background image data, from a first computer or a first process used to create the sub-images to a second computer or a second process;
    (f) further analyzing the sub-images at the second computer or second process to decode the written indicia in the sub-images by applying character recognition logic to the sub-images, where the written indicia further may include one or more of logos, stamps, meter marks, alphanumeric information, labels or other distinctive marks;
    (g) determining the identity of a sub-image from among a predetermined set of possible postal data types based on criteria including the position of the sub-image on the surface; and
    (h) determining a delivery address for each mail piece.

2. The method of claim 1, further comprising forming a data packet containing the sub-images and associated coordinates for the image data from each mail piece.

3. The method of claim 1, wherein step (h) further comprises, if applying character recognition logic to a sub-image does not decode a sub-image to a predetermined level of confidence, displaying the sub-image to a human operator for editing of data fields which correspond to information in the sub-images.

4. The method of claim 3, wherein the transmitting step (e) further comprises transmitting image coordinates of the sub-images to the second computer or second process, whereby each sub-image can be displayed at a position that corresponds to its original location in the image, and step (h) further comprises reconstructing a facsimile of the scanned image of the mail piece surface by simultaneous display of the sub-images at positions indicated by the image coordinates.

5. The method of claim 1, wherein the scanner is part of an automated mail sorting machine which sorts the mail pieces based on the delivery address.

* * * * *